US006997270B2

(12) United States Patent
Mody et al.

(10) Patent No.: US 6,997,270 B2
(45) Date of Patent: Feb. 14, 2006

(54) COMPOUNDS AND METHOD FOR GENERATING A HIGHLY EFFICIENT MEMBRANE IN WATER-BASED DRILLING FLUIDS

(75) Inventors: Fersheed K. Mody, Houston, TX (US); Kenneth W. Pober, Houston, TX (US); Chee P. Tan, City Beach (AU); Calum J. Drummond, Ivanhoe (AU); George Georgaklis, Waverley (AU); Darrell Wells, Rowville (AU)

(73) Assignees: Halliburton Energy Services, Inc., Duncan, OK (US); Commonwealth Scientific and Industrial Research Organisation

(*) Notice: Subject to any disclaimer, the term of this patent is extended or adjusted under 35 U.S.C. 154(b) by 127 days.

(21) Appl. No.: 10/432,788

(22) PCT Filed: Dec. 30, 2000

(86) PCT No.: PCT/US00/35686

§ 371 (c)(1),
(2), (4) Date: May 27, 2003

(87) PCT Pub. No.: WO02/053873

PCT Pub. Date: Jul. 11, 2002

(65) Prior Publication Data

US 2004/0011563 A1    Jan. 22, 2004

(51) Int. Cl.
*C09K 7/02*    (2006.01)
*E21B 21/00*    (2006.01)
*E21B 49/00*    (2006.01)

(52) U.S. Cl. ............... 175/50; 73/152.43; 166/292; 166/294; 175/40; 175/64; 175/72; 507/127; 507/129; 507/137; 507/138; 507/145

(58) Field of Classification Search ............ 73/152.43; 166/292, 294, 371; 175/40, 50, 64, 65, 72; 507/103, 127, 129, 137, 138, 140, 145
See application file for complete search history.

(56) References Cited

U.S. PATENT DOCUMENTS 2,481,545 A * 9/1949 Wagner et al. ............... 507/113
2,726,207 A * 12/1955 Healey ....................... 507/127

(Continued)

FOREIGN PATENT DOCUMENTS

WO    WO 96 04349 A    2/1996

OTHER PUBLICATIONS

L. Bailey, B. Craster, "New Insight into the Mechanisms of Shale Inhibition Using Water-Based Silicate Drilling Fluids," IADC/SPE Paper 39401. Proceedings of the Drilling Conference, Dallas USA, Mar. 3-6, 1998, pp. 897-906, and particularly, p. 897, left-hand column and p. 906, right-hand column and also the Conclusions paragraph.

(Continued)

*Primary Examiner*—George Suchfield
(74) *Attorney, Agent, or Firm*—Craig W. Roddy; Karen B. Tripp

(57) ABSTRACT

A method is disclosed that affords improved stability to wellbores during drilling in argillaceous formations with water-based drilling fluids. The method comprises adding to the drilling fluid a compound of the invention having the capacity in water to generate a highly efficient membrane on argillaceous materials. The compound is soluble in the drilling fluid at least at the pH at which the compound is added to the drilling fluid or exists in the drilling fluid, but is insoluble in the water in the pores of the argillaceous formations, or at least at the pH of the water in such pores.

33 Claims, 12 Drawing Sheets

U.S. PATENT DOCUMENTS

| | | | | |
|---|---|---|---|---|
| 2,789,949 | A * | 4/1957 | Scotty | 507/140 |
| 2,868,726 | A * | 1/1959 | Brukner et al. | 507/109 |
| 2,896,915 | A * | 7/1959 | Weiss et al. | 507/145 |
| 3,628,615 | A * | 12/1971 | Chenevert | 175/25 |
| 3,640,343 | A * | 2/1972 | Darley | 166/292 |
| 5,925,598 | A * | 7/1999 | Mody et al. | 507/140 |
| 2004/0123985 | A1 * | 7/2004 | Whitfill et al. | 166/294 |

OTHER PUBLICATIONS

C.P. Tan, S.S. Rahman, "Integrated Approach to Drilling Fluid Optimisation for Efficient Shale Instability Management," SPE Paper 48875, Proceedings of SPE International Oil and Gas Conference and Exhibition in ChinaBejing, Nov. 2-6, 1998, pp. 441-456, especially p. 442; Also, cited in the Applicants' specification.

Rui D et al., "Soluble-Silicate Mud Additives Inhibit Unstable Clays," 94(14) Oil and Gas Journal 66-68, Pennwell Publishing Co., Tulsa, Oklahoma, Apr. 1, 1996. Alt.

Mody, F.K, et al, "A Borehole Stability Model to Couple the Mechanics & Chemistry of Drilling Fluid Interaction," Proc. SPE/IADC Drilling Conf., Amsterdam, pp 473-490 (1993).

Van Oort, et al., "Manip. of Coupled Osmotic Flows for Stabilisation of Shales Exposed to Water-based Drilling Fluids," Proc. 70th SPE Ann. Tech. Conf., Dallas, p 497-509 (1995).

Tan, C.P., et al., Managing Physico-Chemical Wellbore Instability in Shales with the Chemical Potential Mech, Proc. Asia Pacific Oil & Gas Conf., Adelaide, p 107-116 (1996).

Whilworth, T.M., et al., "Electrolyte-induced Solute Permeability Effects in Compacted Simectite Membranes," Applied Geochemistry, 533-546 (1994).

Chanevert, M.E., et al., "Shale Swelling at Elevated Temperature and Pressure," Proc. 33rd U.S. Rock Mechanics Symp., Santa Fe, pp. 869-878 (1992).

Tan, C.P., et al., "Effects of Swelling & Hydrational Stress in Shales on Wellbore Stability," Asia Pacific Oil & Gas Conf., Kuala Lumpur, pp. 345-349 (1997).

* cited by examiner

COMPOUNDS AND METHOD FOR GENERATING A HIGHLY EFFICIENT MEMBRANE IN WATER-BASED DRILLING FLUIDS

FIELD OF THE INVENTION

The invention relates to methods and compositions for stabilizing a wellbore during drilling argillaceous formations.

BACKGROUND OF THE INVENTION

Argillaceous formations account for about 75% of drilled sections in oil, gas and geothermal subterranean wells and cause approximately 90% of wellbore instability-related problems during the drilling operations. The formations, including shales, mudstones, siltstones and claystones, are of a fine-grained nature and low permeability but yet are fairly porous and normally saturated with formation water. The combination of these characteristics results in the formations being highly susceptible to time-dependent effective mud support change, which is a function of the difference between the mud (wellbore) pressure and pore fluid (formation) pressure. See Mody, F. K. and Hale, A. H., A Borehole Stability Model to Couple the Mechanics and Chemistry of Drilling Fluid Interaction, *Proc. SPE/IADC Drilling Conf.*, Amsterdam, The Netherlands, pp. 473–490 (1993); van Oort, E., Hale, A. H. and Mody, F. K., Manipulation of Coupled Osmotic Flows for Stabilisation of Shales Exposed to Water-Based Drilling Fluids, *Proc. 70th SPE Annual Technical Conference and Exhibition*, Dallas, USA, pp. 497–509 (1995) and Tan, C. P., Rahman, S. S., Richards, B. G. and Mody, F. K., Integrated Approach to Drilling Fluid Optimisation for Efficient Shale Instability Management, *Proc. SPE International Oil and Gas Conference and Exhibition in China,* Beijing, China, pp. 441–456 (1998), incorporated herein by reference.

When drilling under an overbalance condition in an argillaceous formation without an effective flow barrier present at the wellbore wall, mud pressure will penetrate progressively into the formation. See van Oort, E., Hale, A. H. and Mody, F. K., Manipulation of Coupled Osmotic Flows for Stabilisation of Shales Exposed to Water-Based Drilling Fluids, *Proc. 70th SPE Annual Technical Conference and Exhibition,* Dallas, USA, pp. 497–509 (1995) and Tan, C. P., Richards, B. G. and Rahman, S. S., Managing Physico-Chemical Wellbore Instability in Shales with the Chemical Potential Mechanism, *Proc. Asia Pacific Oil and Gas Conference and Exhibition,* Adelaide, Australia, pp. 107–116 (1996), incorporated herein by reference. Without a physical isolation (impermeable) membrane on the wall, an effective barrier will not be formed as a result of the low permeability of the formation. Due to the saturation and low permeability of the formation, penetration of a small volume of mud filtrate into the formation results in a considerable increase in pore fluid pressure near the wellbore wall. The increase in pore fluid pressure reduces the effective mud support which leads to a less stable wellbore condition, possibly resulting in instability.

The fine pore size and negative charge of clay on pore surfaces cause argillaceous materials to exhibit membrane behaviour. See Whitworth, T. M. and Fritz, S. J., Electrolyte-induced Solute Permeability Effects in Compacted Smectite Membranes, *Applied Geochemistry,* pp. 533–546 (1994), incorporated herein by reference. Hence, the flow of water out of (or into) such materials due to the chemical potential gradient is somewhat similar to the osmotic flow of water through a semi-permeable membrane. The chemical potential gradient across the membrane is generally related to the difference in salt concentration i.e. water activity between the drilling fluid and formation. See Mody, F. K. and Hale, A. H., A Borehole Stability Model to Couple the Mechanics and Chemistry of Drilling Fluid Interaction, *Proc. SPE/IADC Drilling Conf.,* Amsterdam, The Netherlands, pp. 473–490 (1993); van Oort, E., Hale, A. H. and Mody, F. K., Manipulation of Coupled Osmotic Flows for Stabilisation of Shales Exposed to Water-Based Drilling Fluids, *Proc. 70th SPE Annual Technical Conference and Exhibition,* Dallas, USA, pp. 497–509 (1995) and Tan, C. P., Richards, B. G. and Rahman, S. S., Managing Physico-Chemical Wellbore Instability in Shales with the Chemical Potential Mechanism, *Proc. Asia Pacific Oil and Gas Conference and Exhibition,* Adelaide, Australia, pp. 107–116 (1996), incorporated herein by reference. With the water activity of the drilling fluid being lower than the formation activity, an osmotic outflow of pore fluid from the formation, as part of the chemical potential mechanism, will reduce or lessen the increase in pore pressure due to mud pressure penetration. If the osmotic outflow is greater than the inflow due to mud pressure penetration, there will be a net flow of water out of the formation into the wellbore. This will result in the lowering of the pore fluid pressure below the in-situ value. The associated increase in the effective mud support will lead to an improvement in the stability of the wellbore.

For an ideal semi-permeable membrane, only water can pass through the membrane. However, argillaceous materials exhibit a non-ideal semi-permeable ('leaky') membrane behaviour to water-based solutions because argillaceous materials have a range of pore sizes including wide pore throats which result in significant permeability to salts. The wide throats reduce the solute interaction with the pore surfaces which increase the permeability of the membrane to the solutes. Infiltration of solutes will reduce the chemical potential (water activity) of the formation. This will gradually reduce the chemical potential difference between the drilling fluid and the formation, and consequently reduce the osmotic pressure, which can be sustained across the membrane. Hence, the sustainable osmotic pressure will be dependent on the pore size distribution of the argillaceous materials.

The total aqueous potential (pore pressure and chemical potential) of the pore fluid increases with the increase in pore pressure and/or chemical potential (decrease in salt concentration). See Chenevert, M. E. and Osisanya, S. O., Shale Swelling at Elevated Temperature and Pressure, *Proc. 33rd U.S. Rock Mechanics Symposium,* Santa Fe, USA, pp. 869–878 (1992) and Tan, C. P., Richards, B. G., Rahman, S. S. and Andika, R., Effects of Swelling and Hydrational Stress in Shales on Wellbore Stability, *Asia Pacific Oil and Gas Conference and Exhibition,* Kuala Lumpur, Malaysia, pp. 345–349 (1997), incorporated herein by reference. As described above, pore pressure can increase due to mud pressure penetration and osmotic inflow (into the formation) when the water activity of the drilling fluid is higher (lower salt concentration) than the formation activity. In addition, the solute which flowed from the formation of higher salt concentration to the drilling fluid across a 'leaky' membrane will increase the chemical potential (water activity) of the formation. When the total aqueous potential of the pore fluid increases, water will be absorbed into the clay platelets. This water absorption will result in either the platelets moving further apart i.e. swelling if they are free to expand, or the generation of hydrational stress if swelling is constrained.

The hydrational stress will cause a change in the stress distribution around the wellbore and an increase in shear stress which may result in wellbore instability.

From the drilling fluid-argillaceous formation interaction processes described above, it is advantageous to induce a high osmotic outflow from the formation and to reduce the flow of salt across the membrane. This will lead to an increase in effective mud support and either prevent or decrease formation swelling and/or generation of hydrational stress. The osmotic outflow and salt flow are strongly dependent on the membrane efficiency generated by either the drilling fluid (e.g. oil-based mud) or the drilling fluid-formation system (e.g. water-based drilling fluid) and water activity of the formation and drilling fluid (salt type and concentration). Osmotic outflow is additionally dependent on macroscopic flow properties of the formation such as permeability and porosity.

One of the key parameters which can be manipulated to increase the osmotic outflow and to reduce salt flow is membrane efficiency. The efficiency is a measure of the capacity of the membrane to sustain osmotic pressure between the drilling fluid and argillaceous formation. The osmotic outflow increases and salt flow decreases with increase in membrane efficiency. Oil-based muds generate a highly efficient membrane through their water-in-oil emulsion i.e. independently of the formation. As a result, the stability of wells drilled in argillaceous formations with such mud systems is greatly enhanced. However, oil-based muds generally do not always meet environmental compliance in many parts of the world which results in high costs in disposing of the drilling wastes associated with the muds.

Hence, there is a need for environmentally acceptable water-based drilling fluids which can generate a highly efficient membrane on the borehole wall in argillaceous formations in order to meet future requirements of the petroleum industry.

SUMMARY OF THE INVENTION

A method and composition is disclosed for drilling a wellbore in subterranean argillaceous formations and particularly for stabilising a wellbore during such drilling with a water-based drilling fluid or mud. Such formations have pores containing water and salts, and the method and composition of the invention increase the osmotic outflow of such water from the formation into the wellbore. Further, the method and composition of the invention reduce the flow of salts between said formation and the wellbore.

In the method of the invention, a compound that forms a membrane on the wellbore wall is added to the drilling fluid. The compound is soluble in the drilling fluid, at least at the pH at which the compound is added to the drilling fluid or exists in the drilling fluid, but is insoluble in the water in the pores (pore water) of said argillaceous formations, or at least at the pH of the water in such pores. The compound has an acid-base dissociation constant in the range of about 8 to about 12 and is more soluble at or above about pH 9 than at about pH 7. The compound undergoes a pH-induced phase transition between about pH 7 and about pH 13, and shows a change in degree of ionisation at about pH 7 to about pH 13. The membrane preferably has an efficiency greater than about 15% and more preferably greater than about 60%.

The composition of the invention is an aqueous based drilling fluid comprising the membrane-forming compound employed in the method of the invention. Such compounds may be selected, for example, from the group comprising: phenols; long chain fatty acids that can self-assemble in their ionised state; silicic acid; methyl silanetriol; 2-naphthol; tetramethylammonium laurate; tetramethylammonium oleate; potassium methyl siliconate; sodium methyl siliconate; and silicate wherein said silicate was manufactured by dissolution of amorphous silica. Other compounds having the ability to form a membrane on the wellbore wall and be soluble in the drilling fluid but insoluble in the pore water of argillaceous formations may alternatively be used.

BRIEF DESCRIPTION OF THE DRAWINGS

A more complete appreciation of the invention and many of the advantages thereof will be more readily understood by reference to the following description when considered in conjunction with the accompanying drawings in which.

DETAILED DESCRIPTION OF THE PREFERRED EMBODIMENTS

Membrane Generation Mechanisms for Acid-Base Species

We have found that for compounds to generate a highly efficient membrane on the borehole wall in argillaceous formations, a phase transition needs to occur. The transition requires the compounds to be soluble in the borehole drillng fluid conditions while being insoluble in pore water conditions. In this invention, we utilise a pH-induced phase transition. The acid-base compounds need to possess two characteristics. The first is that a marked change in the degree of ionisation needs to occur in the region of about pH 7 to about pH 13. In other words, the compounds need an acid-base dissociation constant, $pK_a$, in the region of about 8 to about 12. The second characteristic is that the compounds should have a low solubility in the vicinity of about pH 7 and a high solubility at relatively high pH.

The ionisation behaviour of monomeric (not self-assembled) acids as a function of pH can be described by:

$$\% \text{ Ionized} = \frac{100}{(1 + 10^{(pK_a - pH)})} \quad (1)$$

where $pK_a$ is the acid-base dissociation constant for the compound.

Figure 1:
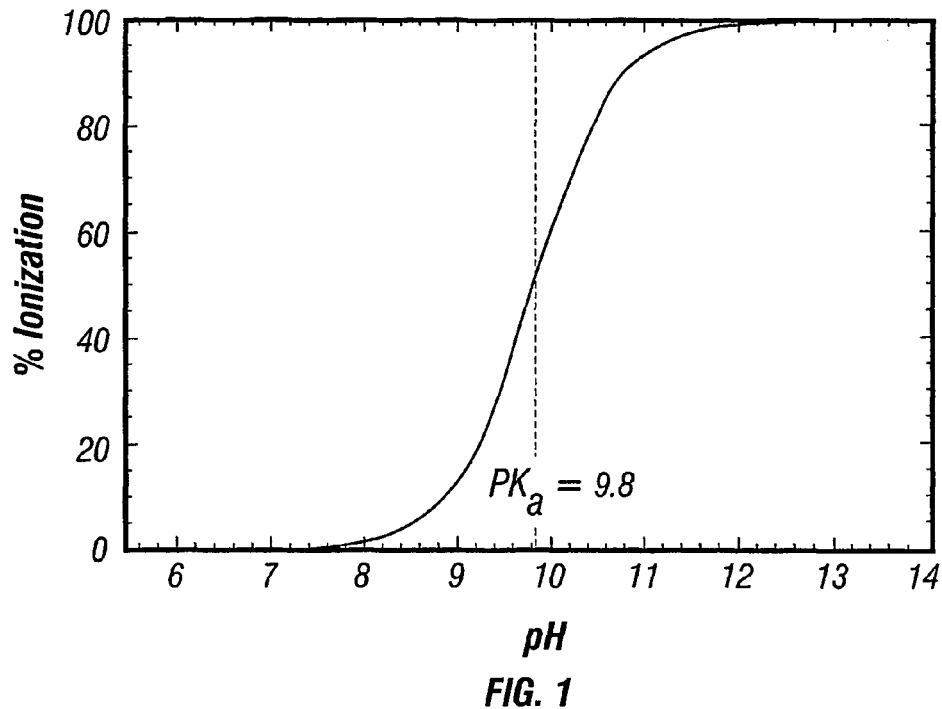
FIG. 1 illustrates graphically the titration curve for an acid with $pK_a=9.8$.

FIG. 1 shows a typical titration curve for an acid with $pK_a = 9.8$. Table 1 provides a collation of calculated percentages of ionised acid, given a $pK_a$ and a pH. Even at pH values that are 2 pH units higher than the $pK_a$, there will still be about 1% un-ionised acid. For 5 wt % and 10 wt % solutions, this 1% of un-ionised acid would constitute an amount of material that would be clearly visible if the un-ionised acid was either a solid or a liquid and had low solubility in water.

The ionisation behaviour of the self-assembled fatty acid salts is not described by Equation (1). As the interface of the self-assembled aggregate is charged and the charge depends on the pH of the solution, $pK_a$ in Equation (1) should be substituted by $pK_a^{app}$ where $$pK_{app}^a = pK_a^o - \frac{e\psi_o}{kT} \quad (2)$$

and $pK_a^o$ is the intrinsic $pK_a$ for fatty acids in the self assembled state, e is the elementary electrostatic charge, $\psi_o$ is the surface potential of the self-assembled aggregate at the particular pH value, k is Boltzman constant and T is the temperature.

TABLE 1

Calculations of percentage of ionised monomeric acid at a given pH variation from the pKa.

| pKa − pH | % Ionised | pKa − pH | % Ionised | pKa − pH | % Ionised |
|---|---|---|---|---|---|
| −6.0 | 99.9999 | −1.2 | 94.06 | 1.4 | 3.83 |
| −5.0 | 99.9990 | −1.1 | 92.64 | 1.5 | 3.07 |
| −4.0 | 99.990 | −1.0 | 90.91 | 1.6 | 2.45 |
| −3.5 | 99.968 | −0.9 | 88.82 | 1.7 | 1.96 |
| −3.4 | 99.960 | −0.8 | 86.32 | 1.8 | 1.56 |
| −3.3 | 99.950 | −0.7 | 83.37 | 1.9 | 1.24 |
| −3.2 | 99.937 | −0.6 | 79.92 | 2.0 | 0.99 |
| −3.1 | 99.921 | −0.5 | 75.97 | 2.1 | 0.79 |
| −3.0 | 99.900 | −0.4 | 71.53 | 2.2 | 0.63 |
| −2.9 | 99.874 | −0.3 | 66.61 | 2.3 | 0.50 |
| −2.8 | 99.842 | −0.2 | 61.31 | 2.4 | 0.40 |
| −2.7 | 99.80 | −0.1 | 55.73 | 2.5 | 0.31 |
| −2.6 | 99.75 | −0.0 | 50.00 | 2.6 | 0.25 |
| −2.5 | 99.68 | 0.1 | 44.27 | 2.7 | 0.199 |
| −2.4 | 99.60 | 0.2 | 38.69 | 2.8 | 0.159 |
| −2.3 | 99.50 | 0.3 | 33.39 | 2.9 | 0.126 |
| −2.2 | 99.37 | 0.4 | 28.47 | 3.0 | 0.100 |
| −2.1 | 99.21 | 0.5 | 24.03 | 3.1 | 0.079 |
| −2.0 | 99.01 | 0.6 | 20.08 | 3.2 | 0.063 |
| −1.9 | 98.76 | 0.7 | 16.63 | 3.3 | 0.050 |
| −1.8 | 98.44 | 0.8 | 13.68 | 3.4 | 0.040 |
| −1.7 | 98.04 | 0.9 | 11.18 | 3.5 | 0.032 |
| −1.6 | 97.55 | 1.0 | 9.09 | 4.0 | 0.010 |
| −1.5 | 96.93 | 1.1 | 7.36 | 5.0 | 0.0010 |
| −1.4 | 96.17 | 1.2 | 5.93 | 6.0 | 0.0001 |
| −1.3 | 95.23 | 1.3 | 4.77 | | |

EXAMPLE 1

Phenols

Members of the phenol class of compounds have $pK_a$ values in the desired region and can have the ionised (more soluble) form at higher pH. Phenol itself is quite soluble in water, but the addition of a methyl group reduces this solubility to about 2 wt %. Most other phenols wit a single small substitueut also have relatively low solubilities in water. Di-alkyl substituted phenols have lower solubilities.

Those phenols that do not polymerise or self-assemble (dimerisation may occur and is considered to be acceptable) may be formulated over a wide range of pH. As the pH value is lowered there will be progressively less water soluble (active) material. Members of this class of compounds can be virtually insoluble at a neutral pH. Some phenols are liquids in the un-ionised form while others are solids.

EXAMPLE 2

Long Chain Fatty Acid Salts

Figure 2:
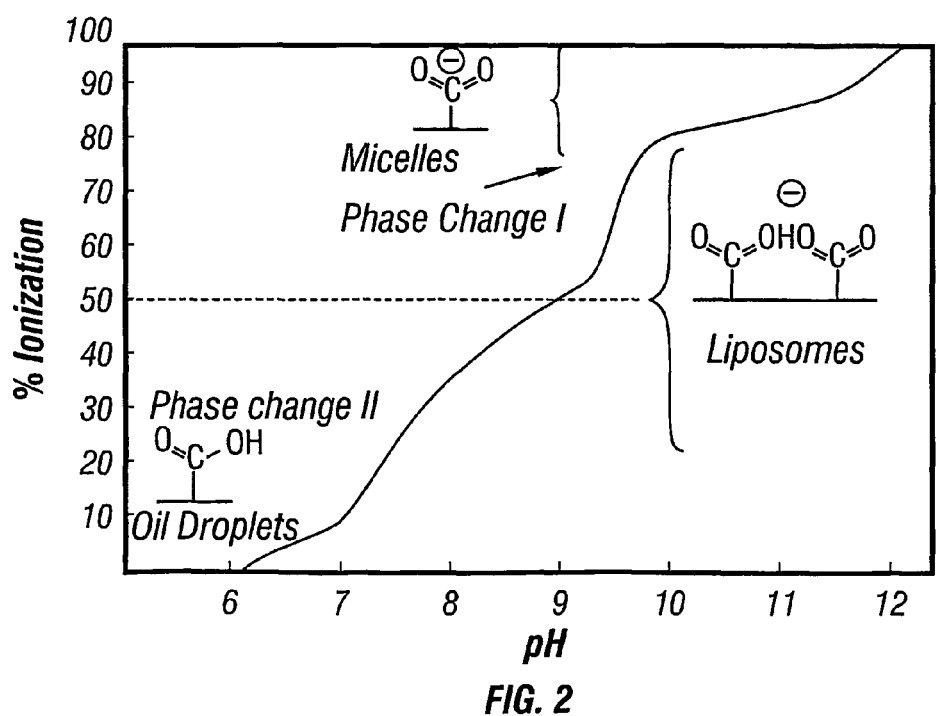
FIG. 2 illustrates graphically a schematic partial phase diagram for a long chain fatty acid (about 0.1 molal) as a function of pH.
Figure 3:
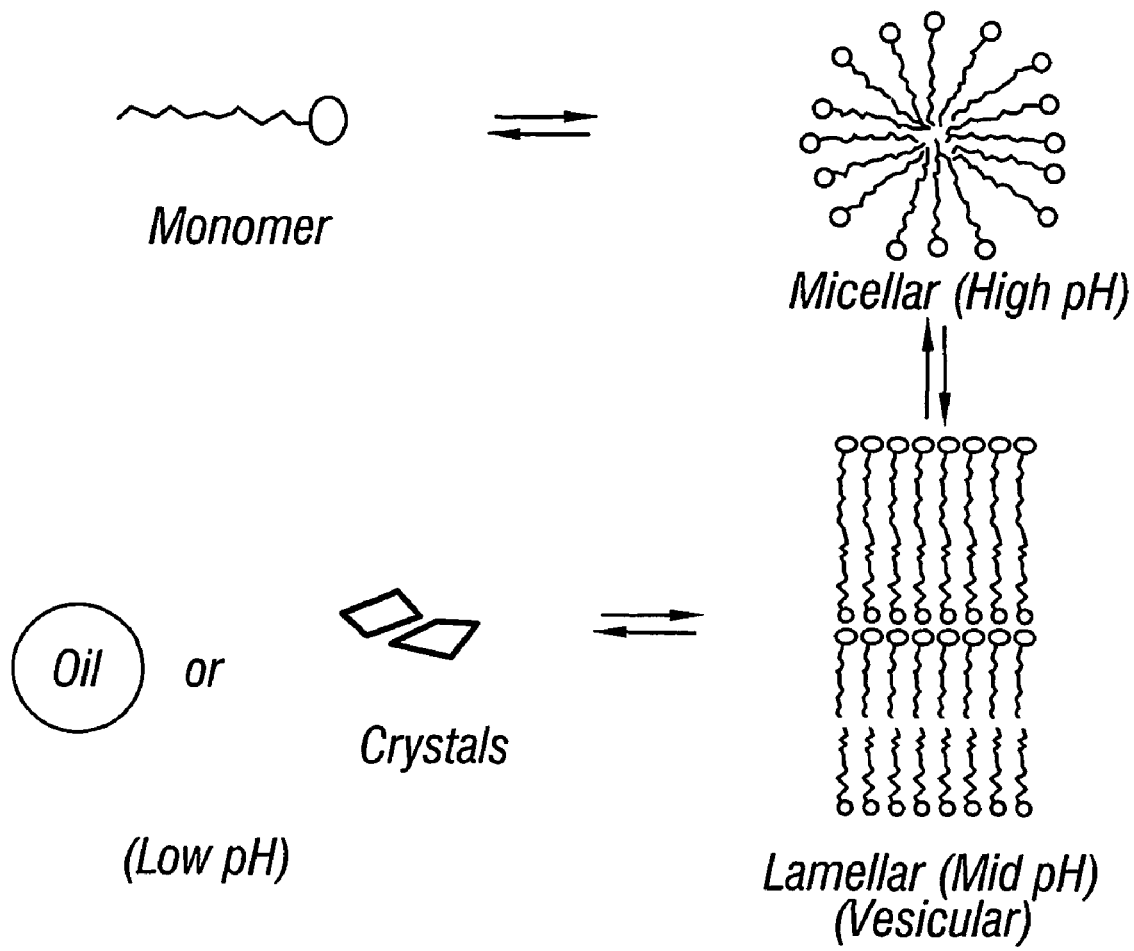
FIG. 3 illustrates diagrammatically the transformation of fatty acids with change in pH.

Long aliphatic chain carboxylic acids (fatty acids) that can self-assemble in their ionised state have complex phase behaviour as a function of aqueous solution pH and electrolyte type and concentration. A schematic partial phase diagram for a long chain fatty acid solution as a function of pH is shown in FIG. 2. In this particular example, at low pH, the fatty acid is in the form of oil droplets dispersed in the water. At intermediate pH values (7.5–9.5), the fatty acid is partially ionised and acid-soap dimers are formed. These dimers self-assemble to form large multilamellar liposomes (vesicles: bilayers of surfactant in an aggregate that has an onion type structure with water interdispersed between the surfactant bilayers). At high pH values (9.5–13.0), the fatty acid approaches complete ionisation and micelles (globular or rod-shaped aggregates with a hydrocarbon core) are formed (see FIG. 3). Long chain carboxylic acids that have a saturated hydrocarbon chain, e.g. lauric acid, can exist as hydrated crystals at low pH while those that have an unsaturated hydrocarbon chain, e.g. oleic acid, can exist as oil droplets. Therefore, for the self-assembled fatty acid salts, a drop of pH can lead to a series of phase transitions from micellar to vesicular (liposomal) to either isotropic liquid (fatty acid oil) or crystalline solid (FIG. 3).

EXAMPLE 3

Silicic Acid

The condensation polymerisation of silicic acid (Si(OH)$_4$, monomer), polysilicic acids (dimers, trimers, tetramers and higher oligomers) and colloidal silica (glass) involves the reaction of a silicate (+SiO$^-$) ion with an un-ionised silanol group:

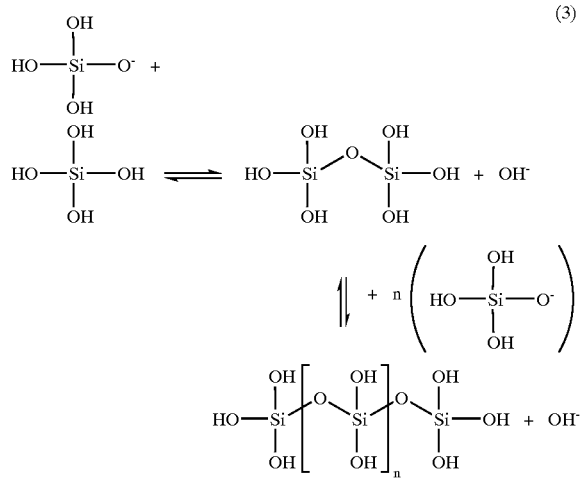

There is a polymerisation-depolymerisation equilibrium.

The pK$_a$ of silicic acid is 9.8 while higher oligomers have a pK$_a$ approaching 6.7. Above pH 11, silica (glass) will dissolve to form silicates until the solution reaches saturation. At high pH values, where the concentration of +SiOH is negligible, depolymerisation/dissolution of glass can occur but very little condensation polymerisation of (poly) silicic acid and (poly)silicate species can occur. At pH values around 7.0, where both (poly)silicic acid and (poly)silicate species are present, polymerisation can be very rapid; for example, small colloidal nanometre-size particles can form in a few minutes at 25° Celsius. When a soluble silicate is mixed with solutions of salts of metals other than the alkali metal group, insoluble amorphous metal silicates can be precipitated. Colloidal silica is coagulated by the same metal salts.

In drilling fluid application:
  At the relatively high pH present in drilling fluid, silicates are soluble and polymerisation is expected to be negligible.
  At the relatively low pH present in pore water, condensation polymerisation can take place and precipitation and coagulation can also occur. These events can all lead to pore volume being filled by solid material. The filling of pores results in increase in membrane efficiency.

EXAMPLE 4

Siliconates

The condensation polymerisation of methyl silanetriol involves the following process:

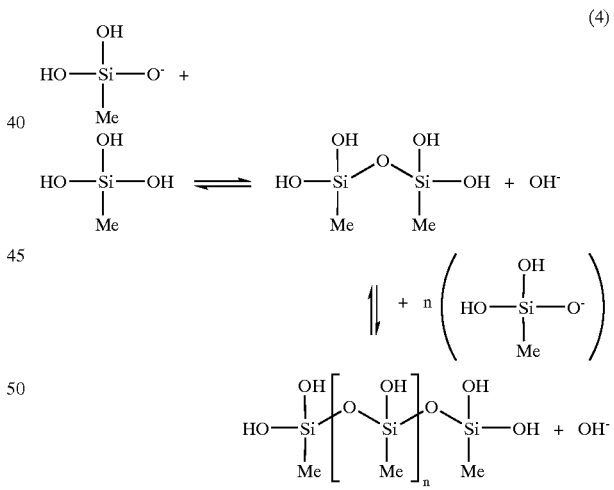

There is a polymerisation-depolymerisation equilibrium.

The pK$_a$ of methyl silanetriol is about 11 while higher oligomers have a pK$_a$ of about 8. Potassium methyl siliconate and sodium methyl siliconate are examples of a soluble base (alkali metal salt) form of methyl silanetriol. When a soluble methyl siliconate is mixed with solutions of salts of metals other than the alkali metal group, insoluble metal methyl siliconates are precipitated.

In drilling fluid application:
  At the relatively high pH present in drilling fluid, the methyl siliconate base form of methyl silanetriol can be soluble and polymerisation is expected to be negligible.

At the relatively low pH in pore water, condensation polymerisation can take place and precipitation can occur. These events can lead to pore volume being filled by solid material. The filling of pores results in an increase in membrane efficiency.

Novel Compounds for Generating Highly Efficient Membranes

Based on the aforementioned fundamental understanding of the membrane generation mechanisms for acid-base species, we have discovered a range of novel compounds for use in water-based drilling fluids that have the capacity to generate a highly efficient membrane on the borehole wall in argillaceous formations. The discoveries are demonstrated in membrane efficiency screening tests, using Pierre II shale samples. Two types of test equipment are used for the present invention: (i) membrane efficiency screening equipment for tests conducted at 25° Celsius and the test solution at 15 MPa, and (ii) autonomous triaxial test equipment for tests conducted at temperatures above 25° Celsius and/or the test solution at 35 MPa.

Figure 4:
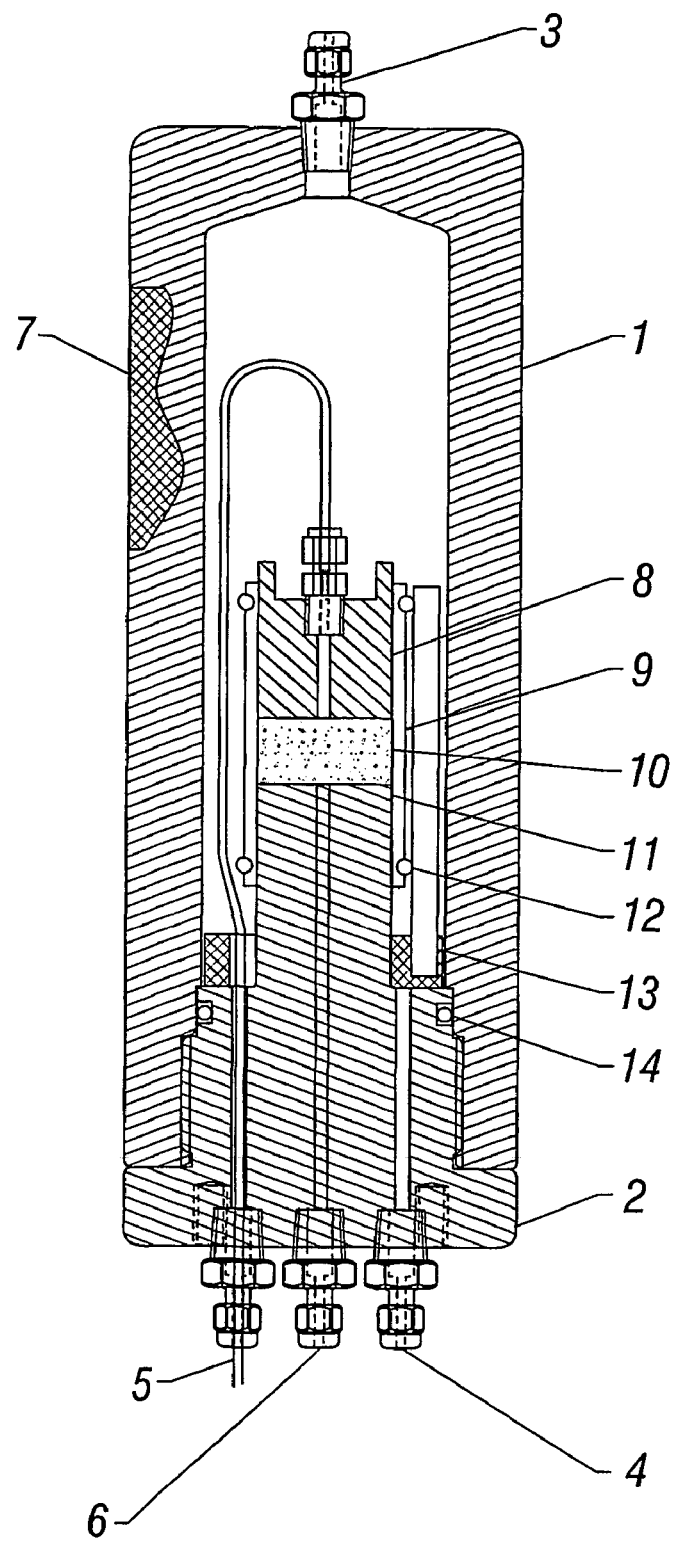
FIG. 4 illustrates a schematic of the test cell of the membrane efficiency screening equipment.

The membrane efficiency screening equipment has six test cells. Six different test solutions can be tested under simulated downhole pressure conditions, at any one time with independent, individual test cell control. A schematic drawing of the test cell is shown in FIG. 4. Referring to FIG. 4, the parts of the cell are shown as follows: Cell-1; Base-2; Bleed Port-3; Confining Fluid Port-4; Downstream Pressure Line (pore fluid)-5; Upstream Pressure Line (test solution)-6; Knurl-7; Top Platen-8; Membrane-9; Sample-10; Bottom Platen-11; O-Rings-12; Collar-13; and Seal-14.

The cell of FIG. 4 has a confining pressure and pore pressure capacity of 35 MPa and 20 MPa respectively. The confining pressure is applied with a Haskel pump and controlled with a high precision stepping motor pump control system. This system is able to control the confining pressure to within ±7 kPa of the target pressure. Two separate high-pressure gas cylinders provide the upstream and downstream pressures which are controlled by high pressure regulators.

The test procedures for the membrane efficiency screening equipment are as follows:
(a) bleed top (downstream) and bottom (upstream) platens 8 and 11 with simulated pore fluid;
(b) place a sample 10 (25 mm diameter and approximately 10 mm long) between the platens 8 and 11;
(c) jacket the sample in a 1.0 mm thick Viton membrane 9;
(d) mount O-rings 12 over the jacket on the platens 8 and 11;
(e) mount the cell 1;
(f) fill the cell 1 with water;
(g) apply a confining pressure of 20 MPa (via port 4);
(h) apply a back (upstream) pressure of 10 MPa (via line 6) and check for flow across the (upstream) platen 8;
(i) open the downstream pressure valve (on line 5) if the (downstream) pressure is less than 10 MPa;
(j) when the downstream pressure has stabilised at 10 MPa (pressure change <50 kPa/hour, i.e. sample has consolidated), increase the upstream pressure to 15 MPa;
(k) when the downstream pressure has increased by at least 2 MPa (pressure transmitted from the upstream end), reduce the upstream pressure to 10 MPa;
(l) when the downstream pressure has stabilised at 10 MPa (pressure change <50 kPa/hour, i.e. sample has reconsolidated), displace the pore fluid at the upstream end with the test solution at 15 MPa (water activity of test solution is not reduced with electrolyte, i.e. essentially the same as that of the shale);
(m) when the downstream pressure has increased and stabilised (pressure transmitted from the upstream end), displace the test solution (at the upstream end) with the lower water activity solution;
(n) adjust the lower water activity solution circulation rate; and
(o) terminate the test when a maximum decrease in the downstream pressure is observed.

Figure 5:
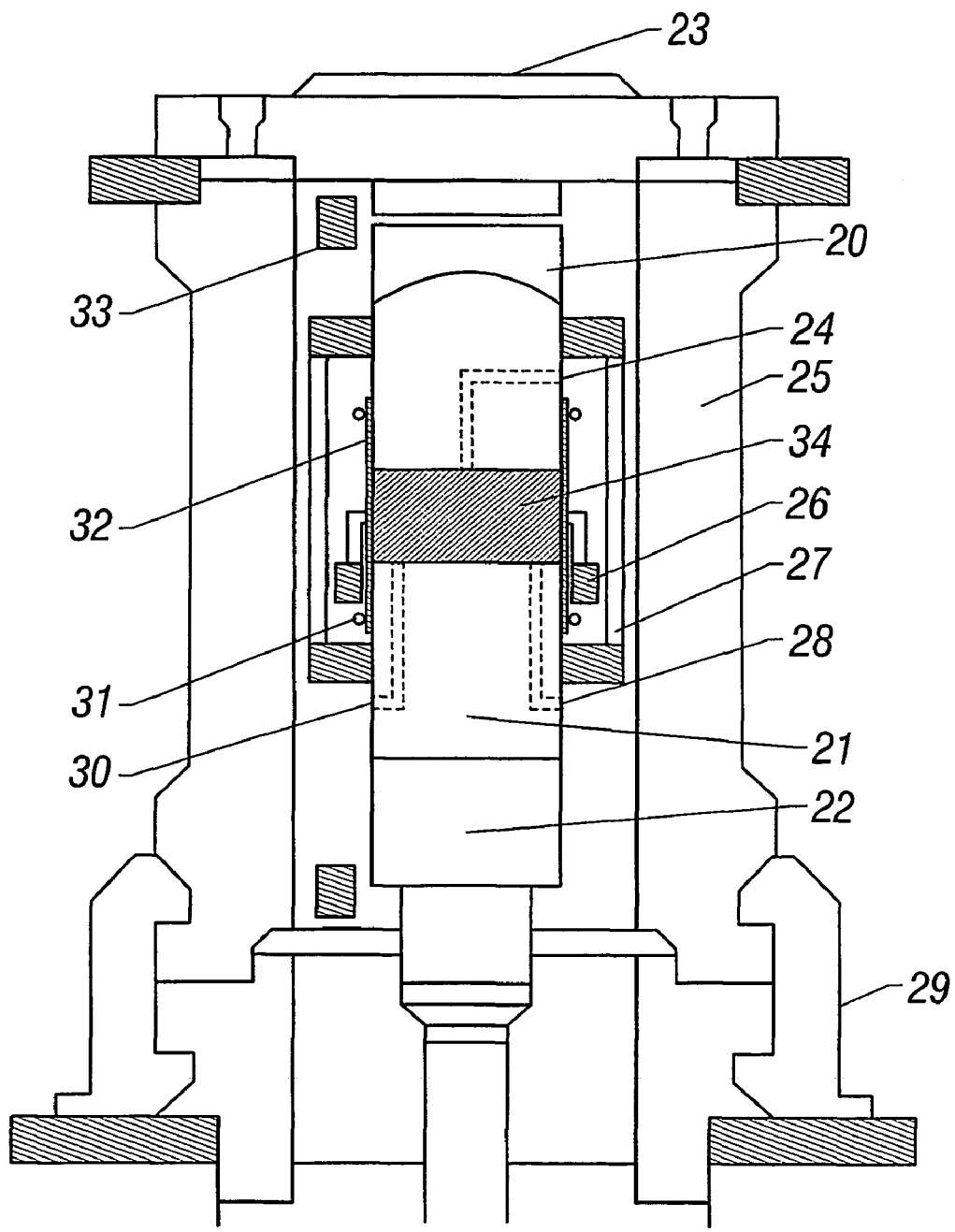
FIG. 5 illustrates a schematic of an autonomous triaxial test cell.

A schematic drawing of the cell of the autonomous triaxial test equipment is shown in FIG. 5. Referring to FIG. 5, the parts of the cell are shown as follows: Top Plate-20; Bottom Platen-21; Load Cell-22; Top Cap-23; Downstream Pore Pressure Port-24; Removable Cell Body-25; Radial Gauges-26; LVDT-27; Upstream Pore Pressure Port-28; Clamping Ring-29; Upstream Flush Pressure Port-30; O-Ring-31; Membrane-32; Temperature Sensor-33; and Sample 34.

The cell of FIG. 5 has a confining pressure and pore pressure capacity of 70 MPa.

The instruments used to measure the behaviour of the test sample 34 are as follows:
(a) two diametrically-opposed LVDTs (Linear Variable Differential Transformers) 27 mounted between the sample end platens to measure axial deformation of the sample 34;
(b) four cantilever (orthogonal) radial gauges 26 mounted at mid-height of the sample 34 to measure radial deformation;
(c) two thermal sensors 33 to measure sample 34 top and bottom temperatures;
(d) a load cell 22 located underneath the bottom platen 21 to measure axial deviatoric load (not used);
(e) a pressure transducer to measure cell (confining) pressure; and
(f) two pressure transducers to measure pore pressure at both ends of the sample 34.

A computer-controlled system was used to control the cell and pore pressures with stepping motor pumps, and to perform data acquisition. During the test, the cell temperature was maintained constant by placing the autonomous triaxial cell in a temperature-controlled oven.

The procedures for the autonomous triaxial test equipment are sequentially:
Test set-up. Bleed top (downstream) and bottom (upstream) platens 20 and 21 with simulated pore fluid. Place a sample 34 (25 mm diameter and approximately 10 mm long) between the platens 20 and 21. Jacket the sample 34 in a 0.5 mm thick Viton membrane 32. Mount O-rings 31 over the jacket 32 on the platens 20 and 21, and install LVDTs 27 and radial gauges 26. Close the cell body 25 and fill with hydraulic oil.
Heating. Enclose the cell 22 in the oven. Raise the cell temperature to the desired value under computer control and allow the temperature to stabilise.
Back-Pressure Saturation. After the cell temperature has stabilised, apply a cell pressure of 6 MPa under an undrained condition. Apply a back-pressure of 5 MPa with simulated pore fluid at the upstream end of the sample. Raise the downstream pressure to 2 MPa to dissolve any small volume of air which may be present in the line and platen groove so as to provide a stiff pressure response to fluid flow from the upstream end of the sample.

Consolidation: When the downstream pressure has increased by about 0.5 MPa, increase the cell pressure to 20 MPa and the upstream pressure to 10 MPa. Allow the sample to consolidate. The excess fluid/pressure is allowed to drain/dissipate and the sample is assumed to be essentially consolidated when the change in average axial strain of the sample is less than 10 microstrain/hour.

Pore Fluid Pressure Transmission. Upon consolidation of the sample, increase the upstream pressure to 15 MPa. When the downstream pressure has equilibrated with the upstream pressure (difference of less than 5%), reduce the upstream pressure to 10 MPa.

Re-consolidation. Allow the excess pore pressure inside the sample to dissipate from 15 MPa to 10 MPa. The sample is assumed to be essentially re-consolidated when the change in average axial strain of the sample is less than 10 microstrain/hour.

Displacement of Upstream Pore Fluid with Test Solution. Following re-consolidation of the sample, displace the pore fluid in the line and upstream platen groove with test solution (water activity of test solution is not reduced with electrolyte, i.e. essentially the same as that of the shale). This is conducted by controlling the test solution pump (inlet) at 10 MPa and reducing the pore fluid pump pressure (outlet) until adequate flow rate is obtained. The volume of test solution pumped must be at least twice the volume of pore fluid in the line and platen groove.

Test Solution Pressure Transmission. When sufficient volume of test solution has been pumped, increase the upstream pressure to 15 MPa.

Displacement of Test Solution with Lower Water Activity Solution. Following the equilibration of the downstream pressure with the upstream pressure, displace the test solution with a lower water activity solution (either electrolyte added to test solution or electrolyte solution). Pump at least twice the volume of the test solution in the line and platen groove.

Test Solution Membrane Generation. Circulate the lower water activity solution with a pressure differential of 0.02–0.05 MPa between the upstream inlet and outlet ports. Terminate the test when a maximum decrease in the downstream pressure is observed.

The membrane efficiency obtained from a test is defined as percentage ratio of the maximum differential pressure developed across the shale sample (upstream pressure minus minimum downstream pressure during chemical potential stage) and the theoretical osmotic pressure of the test solution-shale system. The theoretical osmotic pressure is given by:

$$\prod = -101.3 \frac{RT}{V} \ln\left(\frac{A_{sol}}{A_{sh}}\right) \quad (5)$$

where Π=osmotic pressure (kPa)
R=gas constant (0.083 liter atm mol$^{-1}$ ° K$^{-1}$)
T=absolute temperature (° K)
V=partial molar volume of water (0.018 litre mol$^{-1}$)
$A_{sol}$=water activity of lower water activity solution
$A_{sh}$=water activity of shale

EXAMPLE 1

Electrolyte

Figure 6:
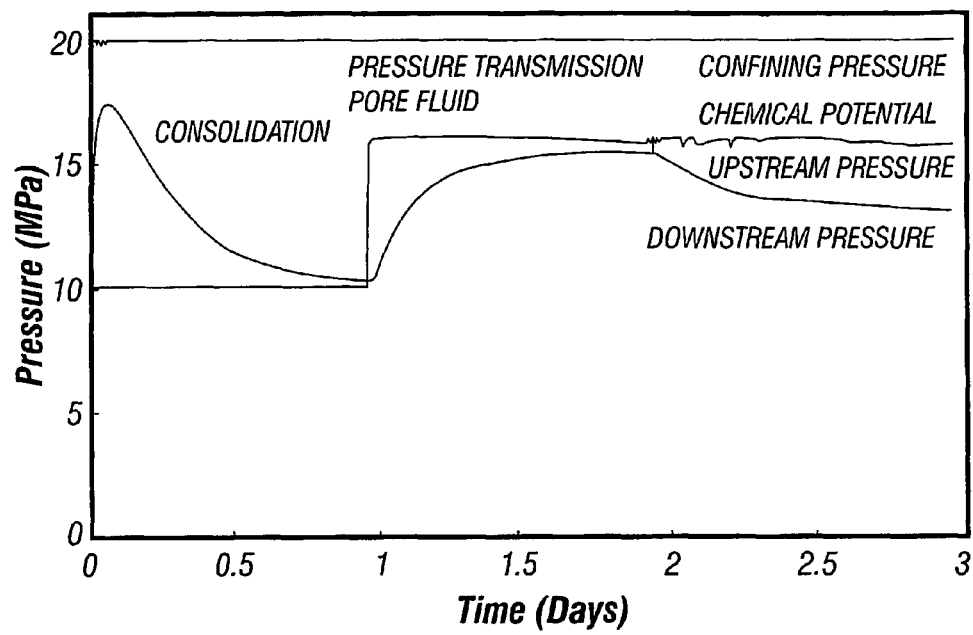
FIG. 6 illustrates graphically the confining, upstream and downstream pressures vs. time for a sodium chloride membrane efficiency screening test with a lower $a_w$ solution of 20 wt % sodium chloride and a test solution of Pierre II shale pore fluid.
Figure 7:
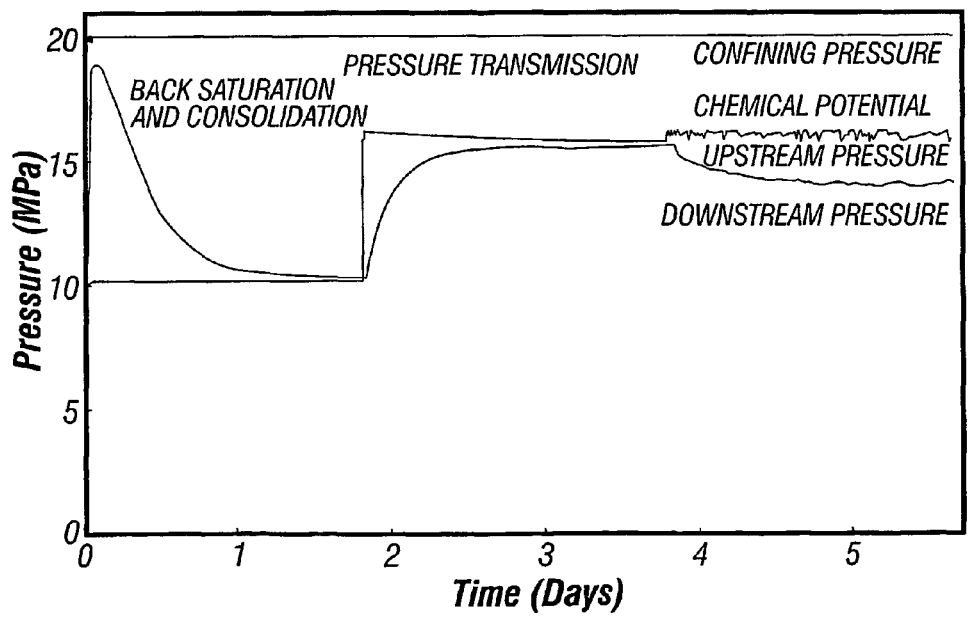
FIG. 7 illustrates graphically the confining, upstream and downstream pressures vs. time for a potassium chloride membrane efficiency screening test with a lower $a_w$ solution of 26.3 wt % potassium chloride and a test solution of Pierre II shale pore fluid.
Figure 8:
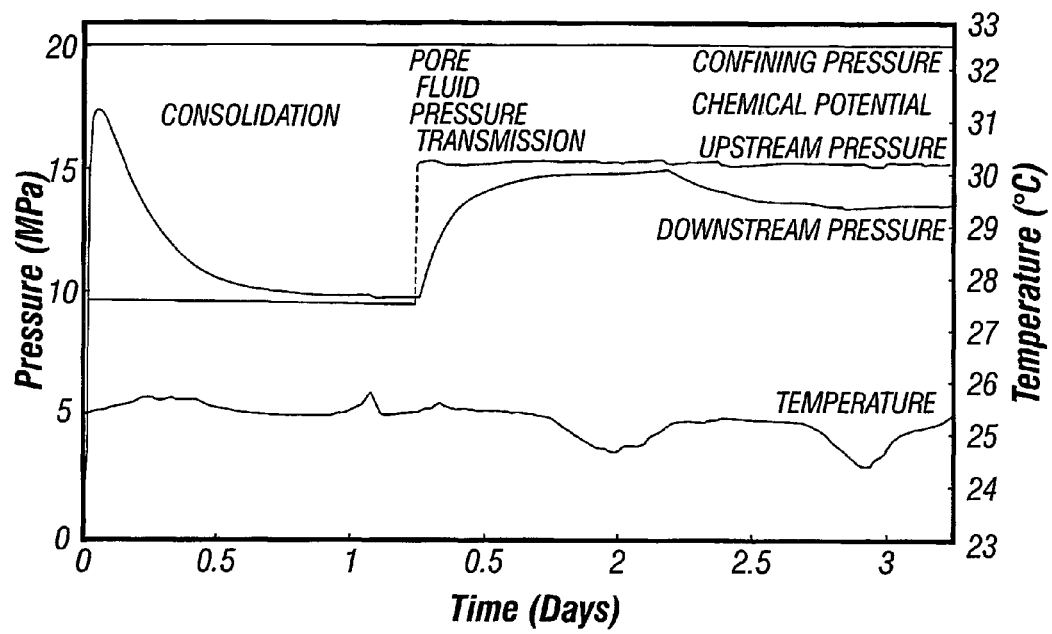
FIG. 8 illustrates graphically the confining, upstream and downstream pressures vs. time for a tetramethylammonium chloride membrane efficiency screening test with a lower $a_w$ solution of 33.4 wt % tetramethylammonium chloride and a test solution of simulated Pierre II shale pore fluid.

The membrane generation capacity of a range of electrolytes was evaluated with stock solutions of about 20 wt % sodium chloride, about 26.3 wt % potassium chloride and about 33.4 wt % tetramethylammonium chloride. The tests were conducted at about 25° Celsius and with the solutions at about 15 MPa. The solutions were not adjusted for pH. FIGS. 6 to 8 show the results of the various stages of those tests. Membrane efficiencies of between about 11% and about 12% were obtained for the sodium chloride solution while the potassium chloride and tetramethylammonium chloride solutions generated membrane efficiencies of about 9% and about 8% respectively.

EXAMPLE 2

2-Naphthol

Figure 9:
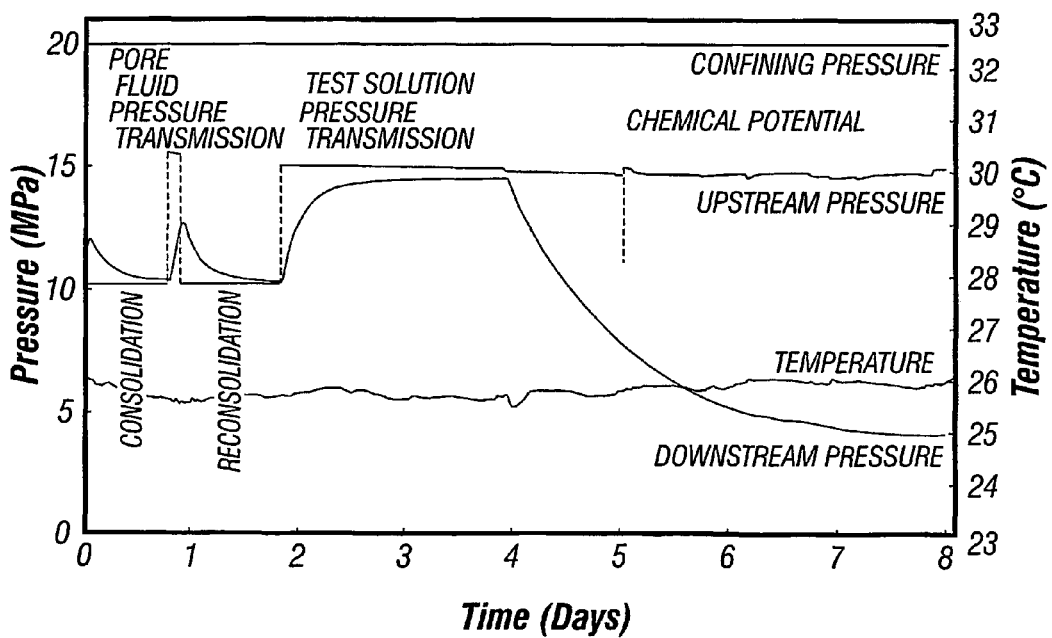
FIG. 9 illustrates graphically the confining, upstream and downstream pressures vs. time for a 2-naphthol membrane efficiency screening test with a lower $a_w$ solution of 10 wt % 2-naphthol with 12 wt % sodium chloride and a test solution of 10 wt % 2-naphthol at pH 12.

A range of phenols was evaluated for their membrane generation capacity at about 25° Celsius and the test solutions at about 15 MPa. The compounds include 2-naphthol which precipitates as a solid. Tests were conducted with 2-naphthol of about 10 wt % concentration and pH of about 11.8 and about 12. The water activity of the solutions was reduced with 12 wt % sodium chloride. The results of the various stages for one of those tests are presented in FIG. 9. Membrane efficiencies of about 65% were obtained with the concentration and range of pH values evaluated. The results show that the membrane generation capacity of the compound did not change significantly between the pH range.

2-Naphthol has a solubility limit (above which 2-Napthol is not soluble) which is about 13 wt % at about pH 12 at about 25° Celsius, and therefore is considered to have membrane generation capacity at least up to this aqueous concentration.

EXAMPLE 3

Tetramethylammonium Laurate

Figure 10:
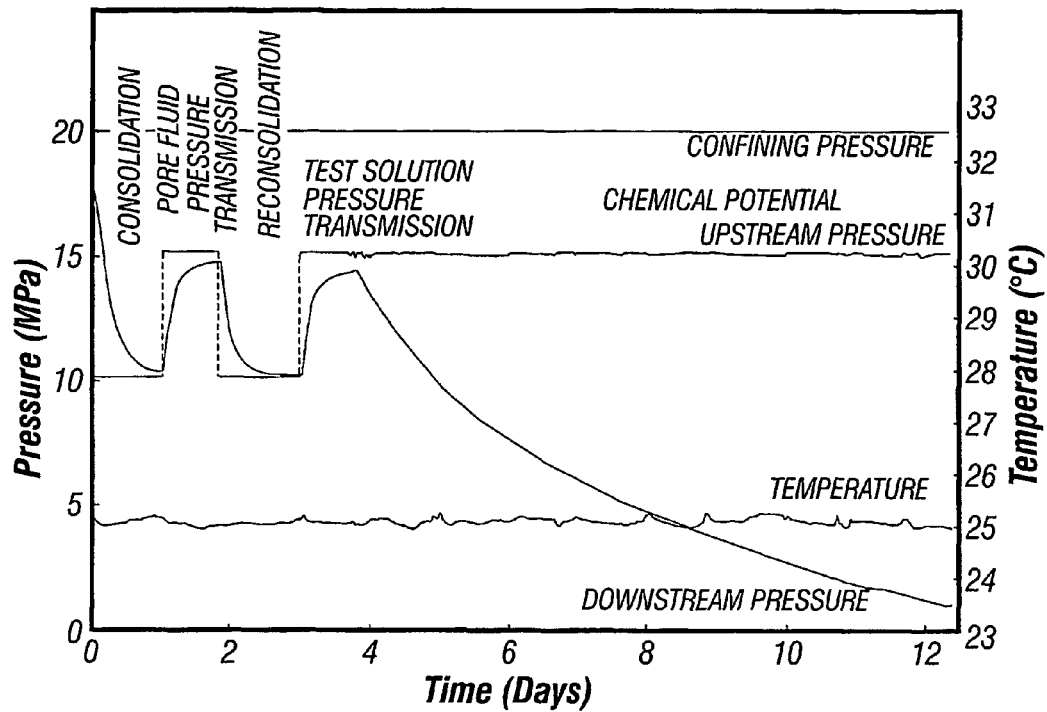
FIG. 10 illustrates graphically the confining, upstream and downstream pressures vs. time for a tetramethylamnonium laurate membrane efficiency screening test with a lower aw solution of 5 wt % lauric acid and tetramethylammonium hydroxide with 33.4 wt % tetramethylammonium chloride and a test solution of 5 wt % lauric acid and tetramethylammonium hydroxide at pH 11.5.
Figure 11:
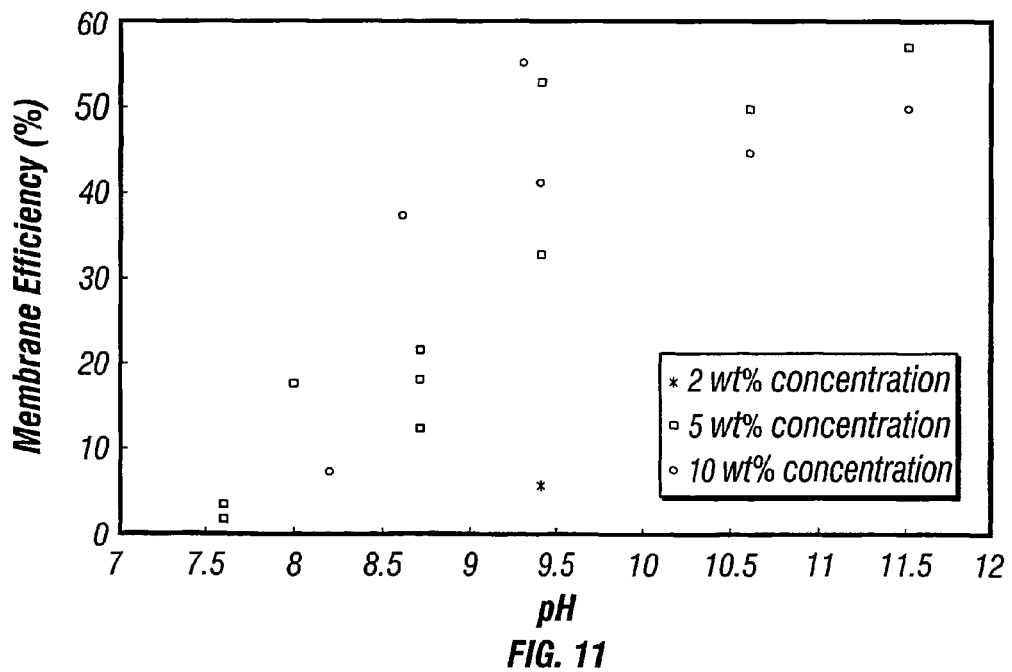
FIG. 11 illustrates graphically the variation of membrane efficiency with concentration and pH for tetramethylamnonium laurate.

The membrane generation capacity of tetramethylammonium laurate was evaluated with concentrations of between about 5 wt % and about 10 wt %, and pH of between about 7.6 and about 11.5. The water activity of the solutions was reduced with 33.4 wt % tetramethylammonium chloride. The results of the various stages for one of those tests are presented in FIG. 10. The variation of membrane efficiency with concentration and pH for the compound tested at about 25° Celsius and the test solutions at about 15 MPa is shown in FIG. 11. It was discovered that for a given concentration, the membrane generation capacity of the compound increased significantly when pH was increased from about 7.6 to about 11.5. The results suggest that fatty acid salts that have micelles present are effective in generating membranes, while those with liposomes (vesicles) are less effective and those with crystalline solid material are ineffective. Membrane efficiencies of up to about 57% were obtained with the range of concentrations and pH values evaluated.

Tetramethylammonium laurate undergoes a phase transition to a hexagonal phase at about 20 wt % at about pH 10 at about 25° Celsius, and therefore is considered to have membrane generation capacity at least up to this aqueous concentration where this phase transition occurs.

EXAMPLE 4

Tetramethylammonium Oleate

Figure 12:
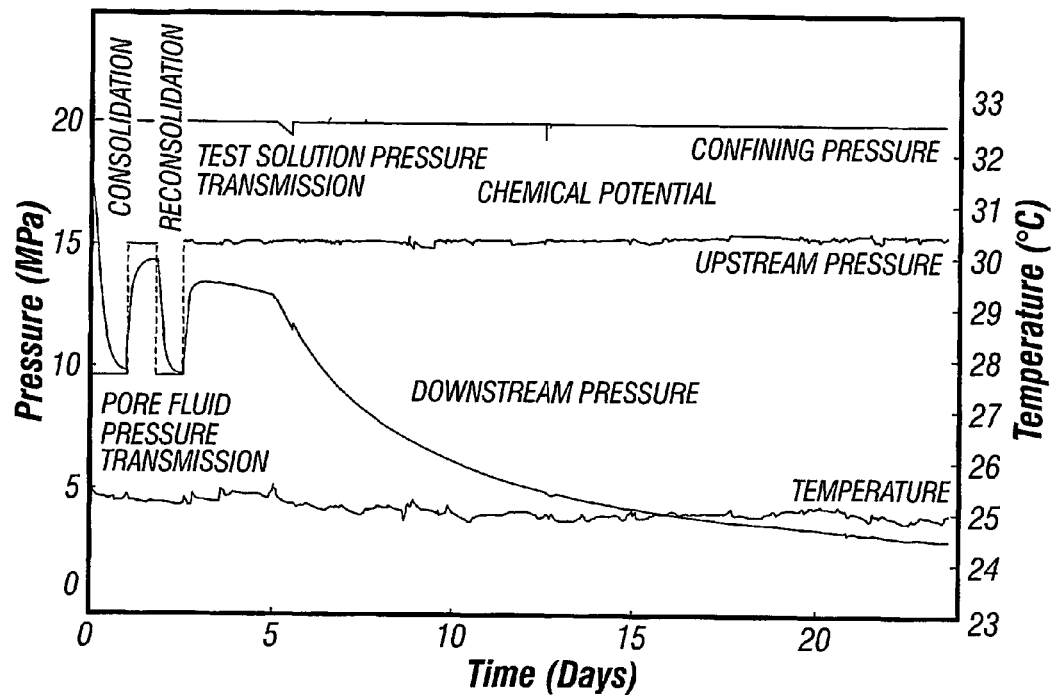
FIG. 12 illustrates graphically the confining, upstream and downstream pressures vs. time for a tetramethylammonium oleate membrane efficiency screening test with a lower $a_w$ solution of 10 wt % oleic acid and tetramethylammonium hydroxide with 33.4 wt % tetramethylammonium chloride and a test solution of 10 wt % oleic acid and tetramethylammonium hydroxide at pH 9.0.

Tetramethylammonium oleate was evaluated for its membrane generation capacity with concentrations of between about 5 wt % and about 10 wt %, and a pH of about 9. The tests were conducted at about 25° Celsius and the test solutions at about 15 MPa. The water activity of the solutions was reduced with 33.4 wt % tetramethylammonium chloride. FIG. 12 shows the results of the various stages for one of those tests. Membrane efficiencies of up to about 44% were obtained with this pH and range of concentrations.

Tetramethylammonium oleate undergoes a phase transition to a hexagonal phase at about 20 wt % at about pH 10 at about 25° Celsius, and therefore is considered to have membrane generation capacity at least up to this aqueous concentration where this phase transition occurs.

EXAMPLE 5

Silicic Acid

Figure 13:
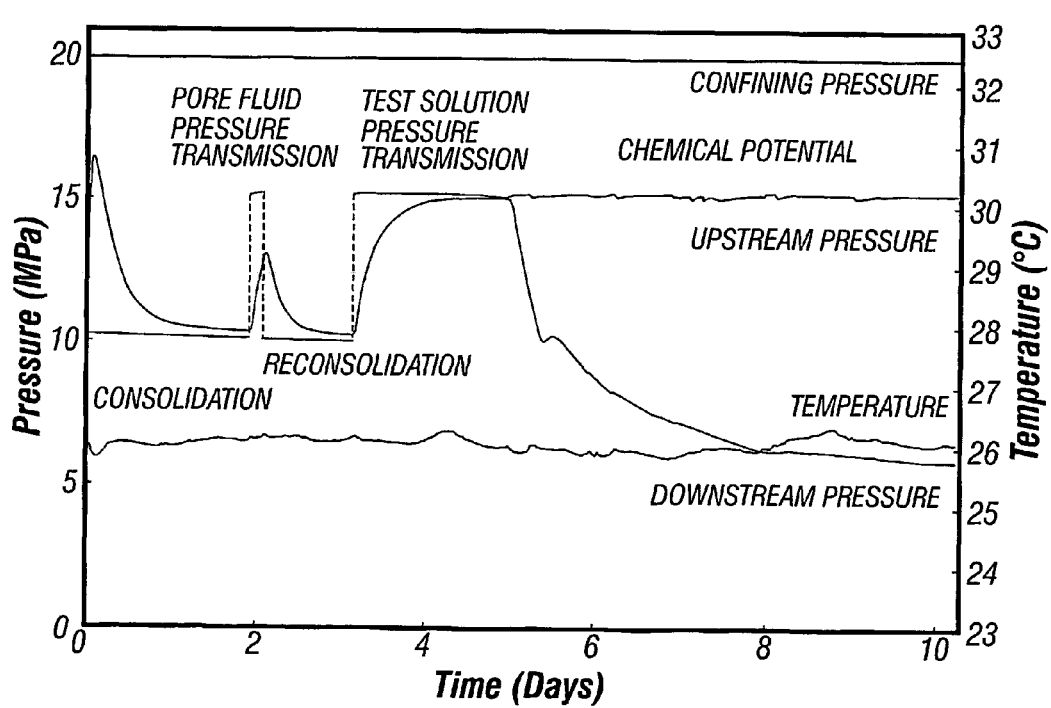
FIG. 13 illustrates graphically the confining, upstream and downstream pressures vs. time for a silicic acid membrane efficiency screening test with a lower $a_w$ solution of 2.5 wt % silicic acid with 12 wt % sodium chloride and a test solution of 2.5 wt % silicic acid at pH 11.50.
Figure 14:
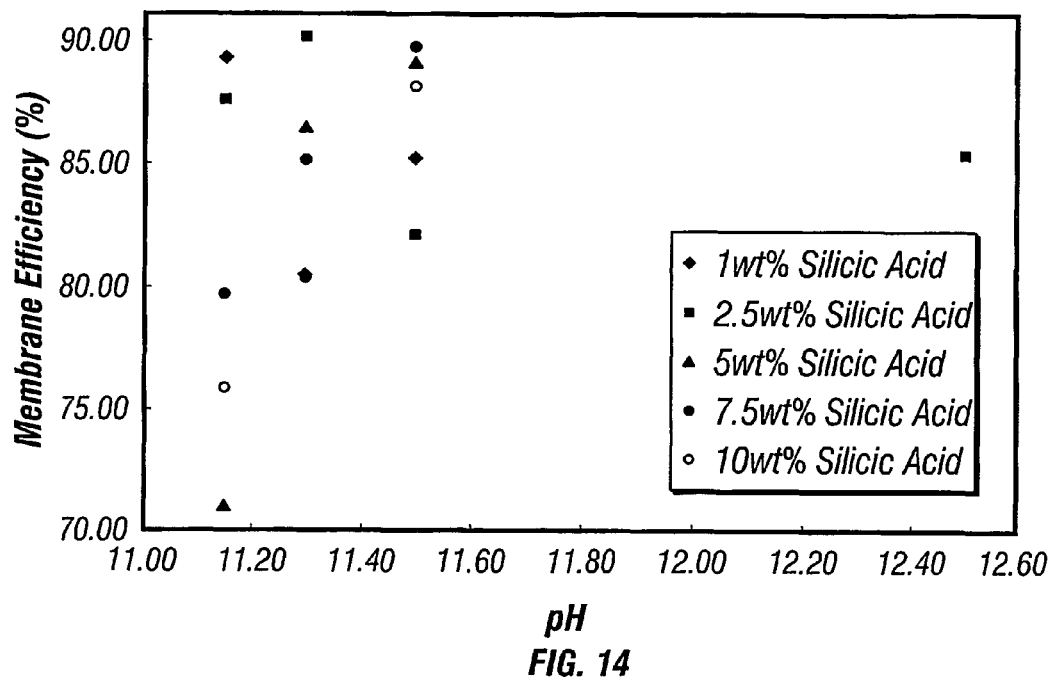
FIG. 14 illustrates graphically the variation of membrane efficiency with concentration and pH for silicic acid.

The membrane generation capacity of extra pure and commercial grade silicic acid was evaluated with concentrations of between about 1 wt % and about 10 wt %, and pH of between about 11.15 and about 12.5. These pH values were measured during the preparation of the solutions. The commercial grade silicic acid was in the form of silica gel and 'precipitated silica'. The water activity of the solutions was reduced with 12 wt % sodium chloride. The results of the various stages for one of those tests are presented in FIG. 13. The variation of membrane efficiency with concentration and pH for the compound tested at about 25° Celsius and the test solutions at about 15 MPa is shown in FIG. 14. It was discovered that membrane efficiencies in excess of 70% were obtained for all the concentrations evaluated, including 1 wt % concentration. The membrane generation capacity of about 1 wt % and about 2.5 wt % silicic acid is essentially the same between pH of about 11.15 and about 12.5. Membrane efficiencies obtained for this concentration and pH range are between about 80% and about 90%. For concentrations between about 5 wt % and about 10 wt %, the membrane generation capacity of the compound increases with increase in pH. Membrane efficiencies of between about 70% and about 90% were obtained for this range of concentrations and pH values.

It was found that there were significant differences in the membrane generation kinetics between silicic acid and the silicate used in silicate muds. Such silicate is manufactured by dissolution of amorphous silica, e.g., glass. Without intending to be bound or limited by speculation, it is nevertheless speculated that the differences could be attributed to the distribution of monomer and oligomer in the two compounds probably due to their different manufacturing processes.

The base sodium salt form of silicic acid has a solubility limit greater than about 45 wt % at about pH 12 at about 25° Celsius, and therefore is considered to have membrane generation capacity at least up to this aqueous concentration.

EXAMPLE 6

Potassium Methyl Siliconate

Figure 15:
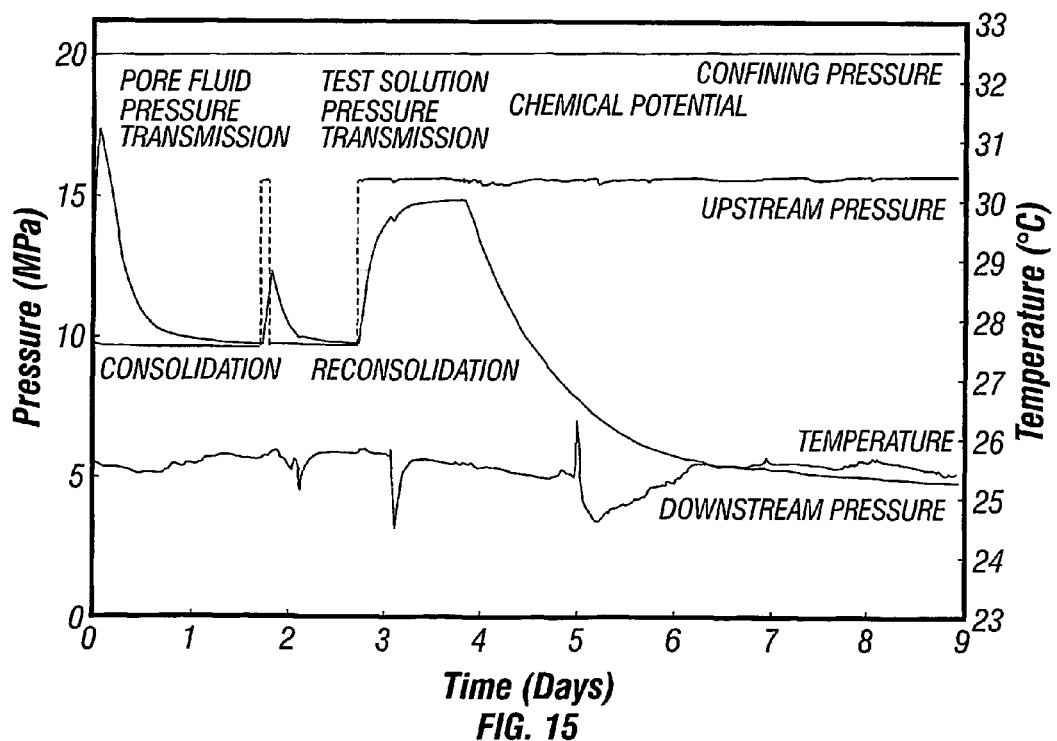
FIG. 15 illustrates graphically the confining, upstream and downstream pressures vs. time for a potassium methyl siliconate membrane efficiency screening test with a lower $a_w$ solution of 10 wt % potassium methyl siliconate with 12 wt % sodium chloride and a test solution of 10 wt % potassium methyl siliconate at pH 11.99.
Figure 16:
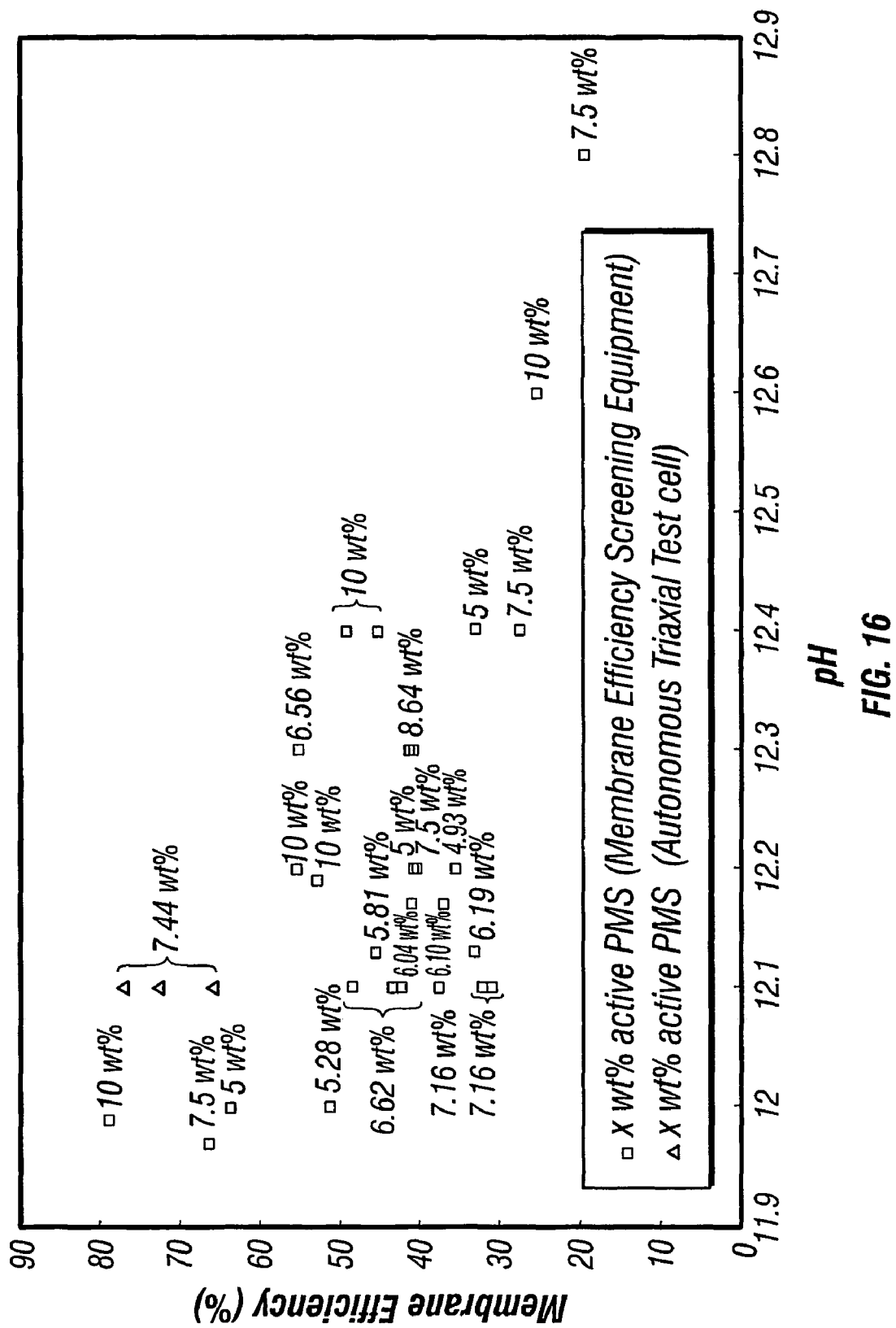
FIG. 16 illustrates graphically the variation of membrane efficiency with active concentration and pH for potassium methyl siliconate.

Potassium methyl siliconate (PMS) was evaluated for its membrane generation capacity with concentrations of between about 5 wt % and about 10 wt %, and pH of between about 11.95 and about 12.8. These pH values were measured during the preparation of the solutions. The water activity of the solutions was reduced with either 12 wt %, 15 wt % or 20 wt % sodium chloride. FIG. 15 shows the results of the various stages for one of those tests. The variation of membrane efficiency with active concentration and pH for the compound tested at about 25° Celsius and the test solutions at about 15 MPa is shown in FIG. 16. It was discovered that, for a given active concentration, the membrane generation capacity of the compound increased greatly when pH was reduced from about 12.8 to about 11.95. Membrane efficiencies of up to about 80% were obtained with the range of concentrations and pH values evaluated.

The membrane generation capacity of potassium methyl siliconate was found to be not significantly affected by temperature of up to about 80° Celsius and only slightly reduced with the test solutions at about 35 MPa. Membrane efficiencies of between about 66% and about 73% were obtained with the test solutions at about 15 MPa and temperatures of between about 50° Celsius and about 80° Celsius. With the test solutions at about 35 MPa and temperatures of between about 40° Celsius and about 80° Celsius, the membrane efficiencies obtained reduced to approximately 54%.

Potassium methyl siliconate has a solubility limit greater than about 40 wt % at high pH at about 25° Celsius, and therefore is considered to have membrane generation capacity at least up to this aqueous concentration.

EXAMPLE 7

Sodium Methyl Siliconate

Figure 17:
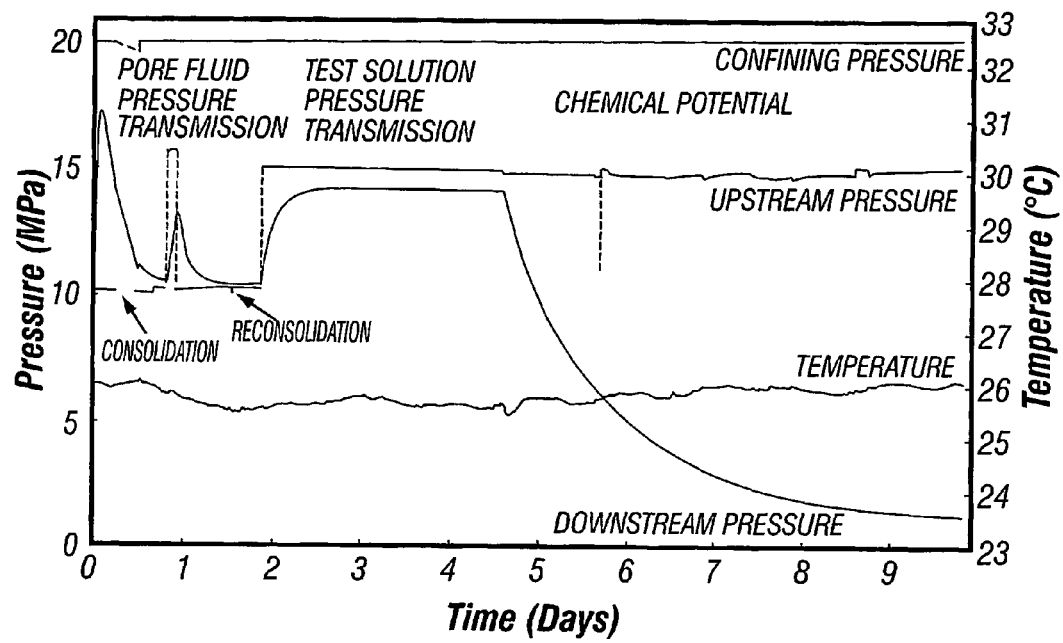
FIG. 17 illustrates graphically the confining, upstream and downstream pressures vs. time for a sodium methyl siliconate membrane efficiency screening test with a lower $a_w$ solution of 10 wt % sodium methyl siliconate with 12 wt % sodium chloride and a test solution of 10 wt % sodium methyl siliconate at pH 12.20.
Figure 18:
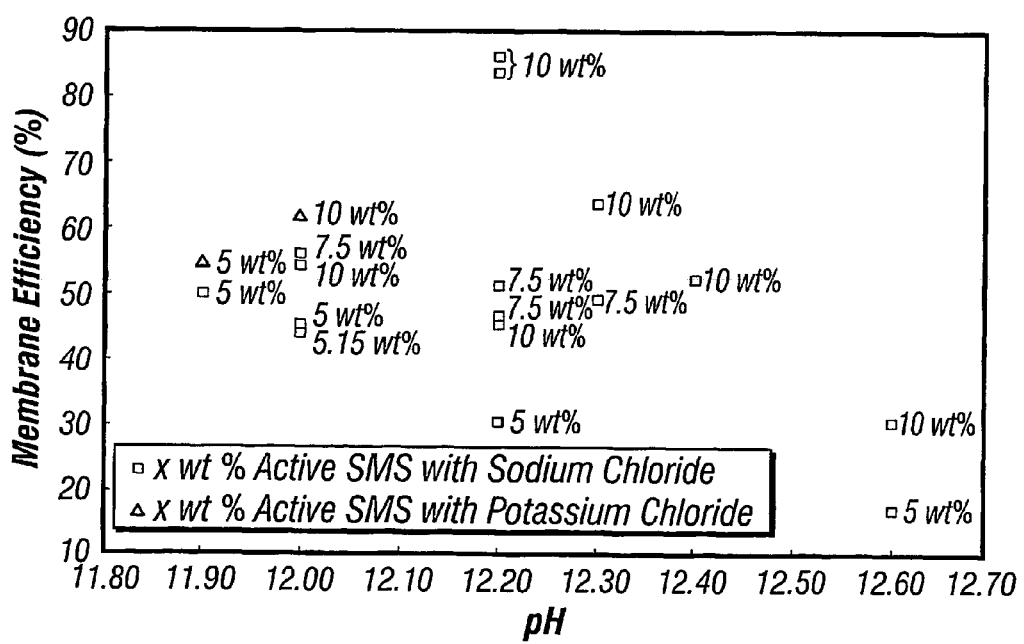
FIG. 18 illustrates graphically the variation of membrane efficiency with active concentration and pH for sodium methyl siliconate.

The membrane generation capacity of sodium methyl siliconate (SMS) was evaluated with concentrations of between about 5 wt % and about 10 wt %, and pH of between about 11.9 and about 12.6. These pH values were measured during the preparation of the solutions. The water activity of the solutions was reduced with either 12 wt % sodium chloride or 16 wt % potassium chloride. The results of the various stages for one of those tests are presented in FIG. 17. The variation of membrane efficiency with active concentration and pH for the compound tested at about 25° Celsius and the test solutions at about 15 MPa is shown in FIG. 18. For a given active concentration, it was discovered that the membrane generation capacity of the compound, in general, increased greatly when pH was reduced from about 12.6 to about 11.9. Membrane efficiencies of up to about 86% were obtained with the range of concentrations and pH values evaluated.

Sodium methyl siliconate has a solubility limit greater than about 40 wt % at high pH at about 25° Celsius, and therefore is considered to have membrane generation capacity at least up to this aqueous concentration.

Enhancement of Membrane Generation Capacity of Silicate

The silicate used in silicate muds is manufactured by dissolution of amorphous silica, e.g., glass. The muds are usually prepared with a pH of about 12.5. Based on the aforementioned fundamental understanding of the membrane generation mechanisms for acid-base species, in particular the membrane generation characteristics of silicic acid, we have discovered that the membrane generation capacity of the silicate (manufactured by dissolution of amorphous silica) can be greatly enhanced with the compound at a lower pH.

Figure 19:
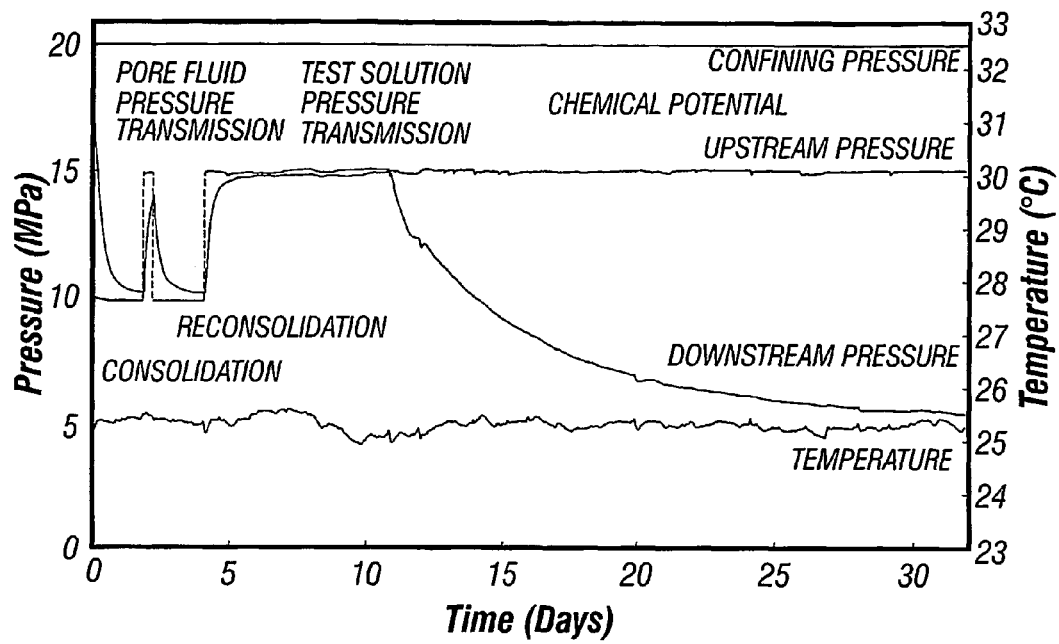
FIG. 19 illustrates graphically the confining, upstream and downstream pressures vs. time for a silicate (manufactured by dissolution of amorphous silica) membrane efficiency screening test with a lower aw solution of 6.5 wt % silicate with 12 wt % sodium chloride and a test solution of 6.5 wt % silicate at pH 11.40. BARASIL-S is a trademark for this silicate product available from Halliburton Energy Services, Inc. in Houston, Tex., United States of America.
Figure 20:
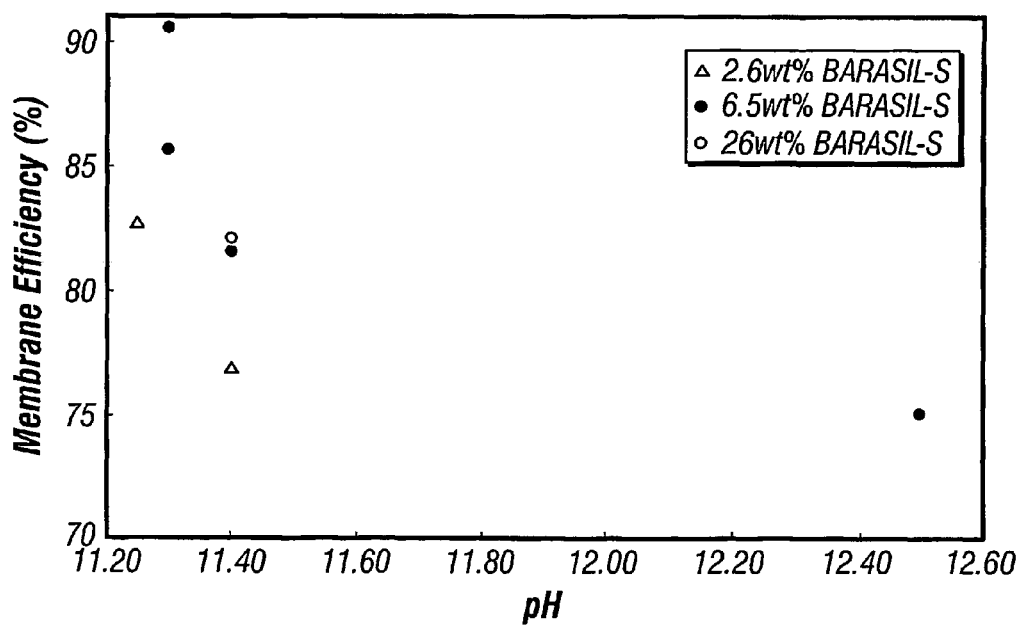
FIG. 20 illustrates graphically the variation of membrane efficiency with concentration and pH for silicate (manufactured by dissolution of amorphous silica). BARASIL-S is a trademark for this silicate product available from Halliburton Energy Services, Inc. in Houston, Tex., United States of America.

The enhancement of the membrane generation capacity of the silicate was evaluated with concentrations of between about 2.6 wt % and about 26 wt % BARASIL-S, and pH of between about 11.25 and about 12.5. The water activity of the solutions was reduced with 12 wt % sodium chloride. The results of the various stages for one of those tests are presented in FIG. 19. The variation of membrane efficiency with concentration and pH for the compound tested at 25° Celsius and the test solutions at 15 MPa is shown in FIG. 20. It was discovered that for a given concentration, the membrane generation capacity of the compound increased significantly when pH was decreased from about 12.5 to about 11.25. Membrane efficiencies of up to about 90% were obtained with the range of concentrations and lower pH values evaluated.

It was found that there were significant differences in the membrane generation kinetics between silicic acid and the silicate. Without intending to be limited or bound by speculation, it is nevertheless speculated that the differences could be attributed to the distribution of monomer and oligomer in the two compounds probably due to their different manufacturing processes.

Although this invention has been described with respect to the presently preferred embodiment, it will be appreciated by those skilled in the art that many changes can be made to the drilling fluids to produce similar or enhanced membrane efficiency on the borehole wall in argillaceous formations. Accordingly, all changes or modifications that come within the meaning and range of equivalency of the claims are to be embraced within their scope.

We claim:

1. A method for stabilising a wellbore during drilling with water-based drilling fluid through argillaceous formations having pores containing water, said method comprising generating a membrane along the wall of said wellbore with a phenol compound that is soluble in said drilling fluid but insoluble in the pore water of said argillaceous formations.

2. The method of claim 1 wherein said compound is progressively less water soluble as the pH is lowered.

3. The method of claim 1 wherein said compound is insoluble at about pH 7.

4. A method for stabilising a wellbore during drilling with water-based drilling fluid through argillaceous formations having pores containing water, said method comprising generating a membrane along the wall of said wellbore with a long chain fatty acid compound that can self-assemble in the ionised state and that is soluble in said drilling fluid but insoluble in the pore water of said argillaceous formations.

5. The method of claim 4 wherein said compound is in the form of oil droplets dispersed in water at pH less than about 9.5.

6. The method of claim 4 wherein said compound partially ionises and forms acid-soap dimers at pH between about 7.5 and about 9.5.

7. The method of claim 4 wherein said compound approaches complete ionisation and forms micelles at pH between about 9.5 and about 13.

8. The method of claim 4 wherein said compound undergoes phase transitions from micellar to vesicular to either isotropic liquid or crystalline solid as pH drops from about 13 to about 7.5.

9. A method for stabilising a wellbore during drilling with water-based drilling fluid through argillaceous formations having pores containing water, said method comprising generating a membrane along the wall of said wellbore with a methyl silanetriol compound that is soluble in said drilling fluid but insoluble in the pore water of said argillaceous formations.

10. The method of claim 9 wherein the base form of said compound is potassium methyl siliconate, sodium methyl siliconate, or a mixture thereof.

11. The method of claim 9 wherein said compound is soluble with negligible polymerisation at relatively high pH.

12. The method of claim 11 wherein said relatively high pH is above about 11.

13. The method of claim 9 wherein said compound undergoes condensation polymerisation, precipitation and coagulation at relatively low pH.

14. The method of claim 13 wherein said relatively low pH is below about 8.

15. A method for drilling a borehole in an argillaceous formation comprising the step;
   providing or using in drilling the borehole a water-based drilling fluid comprising a 2-naphthol compound that generates a membrane on the borehole wall during the drilling of the borehole.

16. The method of claim 15 wherein the concentration of said compound is up to about 13 wt % and the pH of said compound in aqueous solution is greater than about 11.5.

17. The method of claim 15 wherein the membrane efficiency is at least about 15%.

18. A method for drilling a borehole in an argillaceous formation comprising the step of:
   providing or using in drilling the borehole a water-based drilling fluid comprising a tetramethylammonium laurate compound that generates a membrane on the borehole wall during the drilling of the borehole.

19. The method of claim 18 wherein the concentration of said compound is up to about 20 wt % and the pH of said compound in aqueous solution is greater than about 7.5.

20. The method of claim 18 wherein the membrane efficiency is at least about 15%.

21. A method for drilling a borehole in an argillaceous formation comprising the step of:
   providing or using in drilling the borehole a water-based drilling fluid comprising a tetramethylammonium oleate compound that generates a membrane on the borehole wall during the drilling of the borehole.

22. The method of claim 21 wherein the concentration of said compound is up to about 20 wt % and the pH of said compound in aqueous solution is greater than about 9.

23. The method of claim 21 wherein the membrane efficiency is at least about 15%.

24. A method for drilling a borehole in angillaceous formation comprising the step of:
   providing or using in drilling the borehole a water-based drilling fluid comprising a potassium methyl siliconate compound that generates a membrane on the borehole wall during the drilling of the borehole.

25. The method of claim 24 wherein the concentration of said compound is up to about 40 wt % and has a pH of greater than about 11.5 in aqueous solution.

26. The method of claim 24 wherein the membrane efficiency is at least about 15%.

27. A method for drilling a borehole in an argillaceous formation comprising the step of:
   providing or using in drilling the borehole a water-based drilling fluid comprising a sodium methyl siliconate compound that generates a membrane on the borehole wall during the drilling of the borehole.

28. The method of claim 27 wherein the concentration of said compound is up to about 40 wt % and the compound in aqueous solution has a pH of greater than about 11.5.

29. The method of claim 27 wherein the membrane efficiency is at least about 15%.

30. A method for enhancing the stability of a wellbore penetrating an argillaceous formation having pores containing water while drilling said wellbore with an aqueous based drilling fluid through said argillaceous formation, said method comprising: (a) determining the pH of said pore water and the pH of said drilling fluid; (b) adjusting or maintaining said pH of said drilling fluid to a level greater than the pH of said pore water; and (c) adding to said drilling fluid a compound that has an acid-base dissociation constant in a range above the pH of said pore water and that is more soluble in water at a pH above the pH of said pore water than at the pH of said pore water, wherein said compound is selected from the group comprising: phenols, long chain fatty acids that can self-assemble in their ionised state, methyl silanetriol, and mixtures thereof.

31. The method of claim 30 wherein said compound comprises a long aliphatic chain carboxylic acid that can self-assemble in its ionised state wherein said fatty acid forms micelles at the pH of said drilling fluid and forms crystals or oil droplets at the pH of said pore water.

32. The method of claim 31 wherein said pH of said drilling fluid is within a range of about 9.5 to about 13.0 and said pH of said pore water is less than about 7.5.

33. The method of claim 31 wherein said compound comprises a fatty acid that undergoes phase transitions from micellar to vesicular or liposomal to either isotropic liquid or crystalline solid as pH drops from the pH of the drilling fluid to the pH of the pore water.

* * * * *